(12) United States Patent
Hung

(10) Patent No.: US 7,257,545 B1
(45) Date of Patent: Aug. 14, 2007

(54) CONFIGURABLE ELECTRONIC REDEEMABLE COUPON

(76) Inventor: Patrick Siu-ying Hung, 19291 De Havilland, Saratoga, CA (US) 95070

( * ) Notice: Subject to any disclaimer, the term of this patent is extended or adjusted under 35 U.S.C. 154(b) by 1017 days.

(21) Appl. No.: 09/625,442

(22) Filed: Jul. 26, 2000

(51) Int. Cl.
 *G06Q 30/00* (2006.01)
(52) U.S. Cl. ..................................... 705/14
(58) Field of Classification Search .................. 705/14
 See application file for complete search history.

(56) References Cited

U.S. PATENT DOCUMENTS

| | | | | |
|---|---|---|---|---|
| 5,221,838 A | * | 6/1993 | Gutman et al. | 235/379 |
| 5,285,496 A | * | 2/1994 | Frank et al. | 380/271 |
| 5,343,028 A | | 8/1994 | Figarella et al. | 235/462 |
| 5,521,371 A | * | 5/1996 | Hotta et al. | 235/487 |
| 5,523,794 A | * | 6/1996 | Mankovitz et al. | 705/14 |
| 5,594,493 A | * | 1/1997 | Nemirofsky | 725/23 |
| 5,812,937 A | * | 9/1998 | Takahisa et al. | 455/66 |
| 5,870,030 A | * | 2/1999 | DeLuca et al. | 340/7.48 |
| 5,999,914 A | | 12/1999 | Blinn et al. | 705/26 |
| 6,036,086 A | | 3/2000 | Sizer, II et al. | 235/375 |
| 6,075,971 A | | 6/2000 | Williams et al. | 455/5.1 |
| 6,082,620 A | | 7/2000 | Bone | 235/462.16 |
| 6,333,737 B1 | * | 12/2001 | Nakajima | 345/205 |
| 6,532,375 B2 | * | 3/2003 | Cathey et al. | 455/574 |
| 6,628,729 B1 | * | 9/2003 | Sorensen | 375/316 |

FOREIGN PATENT DOCUMENTS

WO  WO 00/39657  *  7/2000

OTHER PUBLICATIONS

Bushnell, Richard D., et al, Getting started with bar codes, Quad II, Inc., 30, 31, 36-38, 43, 53-57, 225-232.*

* cited by examiner

*Primary Examiner*—Jeffrey D. Carlson

(57) ABSTRACT

A scannable coupon, such as a bar code, is generated on a configurable display of a portable electronic device, such as a personal digital assistant, handheld computer, or mobile telephone. The display has sufficient resolution and contrast to be scanned at a point-of-sale computer for redemption of the coupon. In a further embodiment, generic coupon information is sent to the portable electronic device, which can generate a scannable coupon in any one of several formats. In another embodiment, coupon information is sent in one format and the portable electronic device converts it to another format. In yet a further embodiment, a number of coupons are stored in a data structure according to a redemption characteristic, and may be serially displayed according to user input, such as pushing a step key.

11 Claims, 4 Drawing Sheets

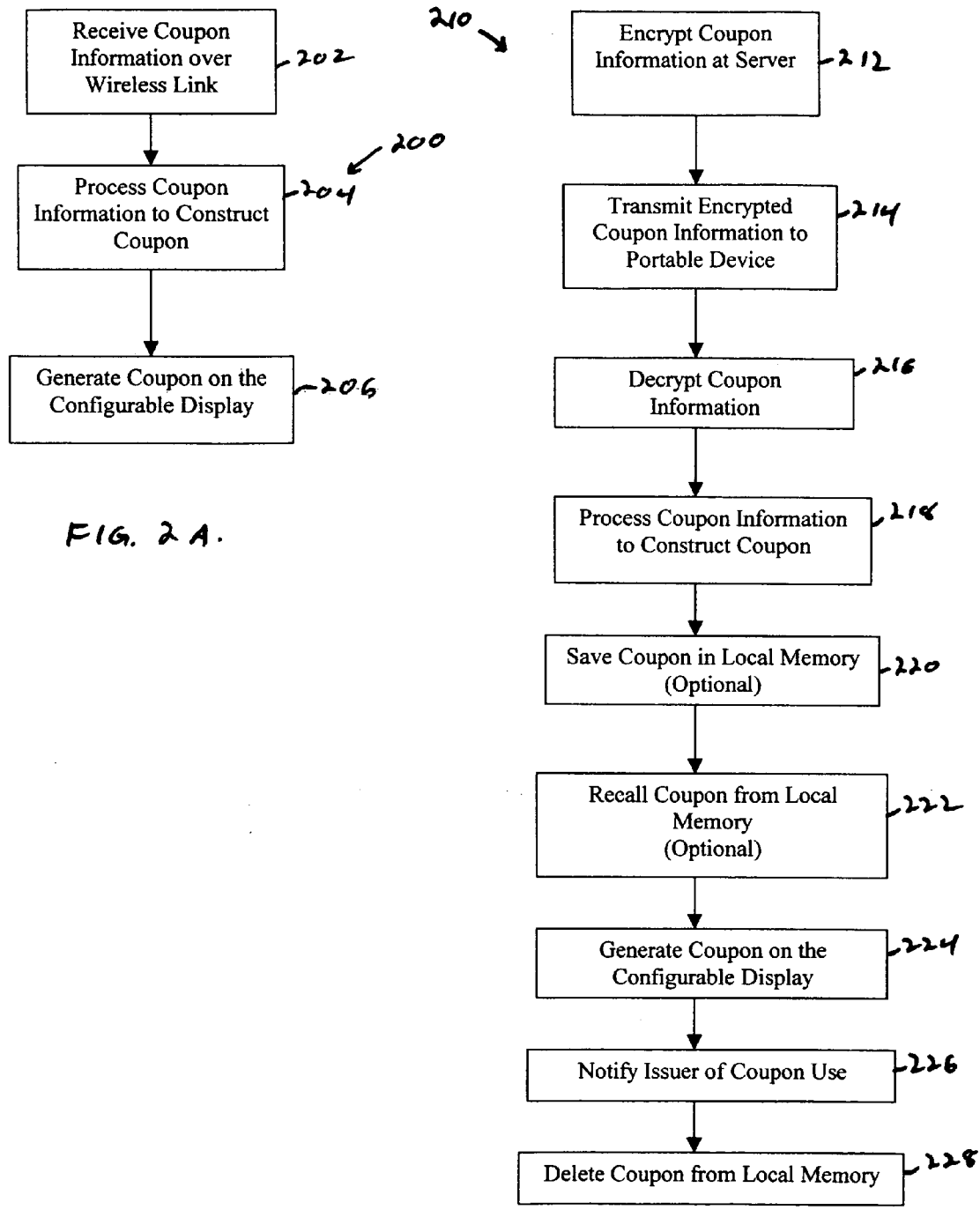

CONFIGURABLE ELECTRONIC REDEEMABLE COUPON

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The present invention is related generally to redeemable coupons for use by a consumer at a point-of-sale ("POS"), and more particularly to methods and apparatus for generating a computer-readable coupon on a display of a portable electronic device.

Coupons for use by a consumer are used in a variety of fashions. Coupons might provide a fixed amount off of a sale price, a percentage discount, or free merchandise, for example. Merchandisers use coupons for a variety of purposes. A manufacturer of a product might provide a coupon with a product package for a discount on the next purchase of the same or a different product, or a retailer might provide a coupon in a newspaper or other printed medium to encourage a consumer to shop at his store, for example. A retailer might also print a coupon out at the time of sale for a purchaser, according to what the purchaser bought, to encourage that purchaser to return to the store, buy a related good, and/or to buy more of the same goods.

With the introduction of scanning devices at check-out counters, coupons typically now have a computer-readable field on them so that the coupon information, such as product type, manufacturer identification and discount, can be automatically entered. This field is often a "bar code", and is read by a laser scanner. The scanner can also read bar codes on the labels of the products being purchased, such as UPC (Universal Product Code), thus the process of applying the coupon discounts to the appropriate merchandise is less cumbersome than when the check-out clerk had to enter each coupon amount into the cash register through a keyboard.

However, paper coupons can be both inconvenient and ineffective. A consumer might not save the coupon, might forget to bring it with him to the store, or not be able to find it. The inability to receive a discount the consumer knows is available with the missing coupon might actually deter a purchase. Many consumers find coupons bothersome in that the coupons can create, clutter. Furthermore, it can be inconvenient while waiting at the check-out counter to sort through a stack of coupons to find the one applicable to the purchase, and other consumers standing in line waiting to be served might become impatient waiting for the purchaser to find his coupons. Finally, while product bar codes and scanning protocol are generally consistent within a geographic region, some coded coupons might not work out of the area in which they were produced for. In addition, retail merchants face additional burdens and challenges related to monitoring and tracking coupons to reduce fraud and ensure proper discounting and redemption policies.

Thus, there is a need for a coupon and redemption techniques that overcome the above difficulties.

SUMMARY OF THE INVENTION

The present invention provides a portable electronic device capable of generating configurable computer-readable coupons on a display. Coupon information is stored in the device, or is transmitted to the device over a wireless network, or generic coupon data is transmitted to the device and locally formatted to the display, for example. The device can store many coupons at one time, and present them in serial fashion to: a scanning device, such as a light pen, charge-coupled diode array, or laser scanner. In addition to product information, the coupon can display expiration dates, offer codes, value codes, serialized identification numbers, and customer information, such as customer identification, and issuer or redeemer information.

In a further embodiment, the coupon information has an automatic expiration feature that deletes itself from memory in the portable electronic device after expiration. In a particular embodiment, the display is a dot-matrix type of display with persistent pixels that stay darkened between strobe signals used to activate the pixel.

BRIEF DESCRIPTION OF THE DRAWINGS

FIG. 2A is a simplified flow chart of a coupon configuration process according to an embodiment of the present invention;

FIG. 2B is a simplified flow chart of another process according to the present invention;

WRITTEN DESCRIPTION OF SPECIFIC EMBODIMENTS

1. Introduction

The present invention provides scannable coupons on the display of a portable electronic device, such as a wireless telephone ("cell phone"), or wireless personal digital assistant ("PDA"), or handheld computer. The scannable coupons are presented as a bar code or similar optically readable characters. In one embodiment, the device combines product information transmitted to the device by the coupon provider with coupon user information. In one embodiment, the device has a liquid crystal display ("LCD") with enhanced resolution to produce scannable coupons for use with standard scanners. In another embodiment, the device has an LCD with typical resolution and configures scannable coupons for use with scanning systems requiring less resolution.

In a further embodiment, coupon information is automatically sent to the portable electronic device. The coupon information can be sent as a result of a subscriber service that the user belongs to, or as a result of user purchases, for example. The coupon information is stored in local memory and used to generate the scannable display. Other information, such as appropriate product code type and consumer information, is also encoded on the scannable display. In yet a further embodiment, text associated with the user product is displayed concurrently with the scannable field of the display.

2. Portable Electronic Devices

Figure 1A:
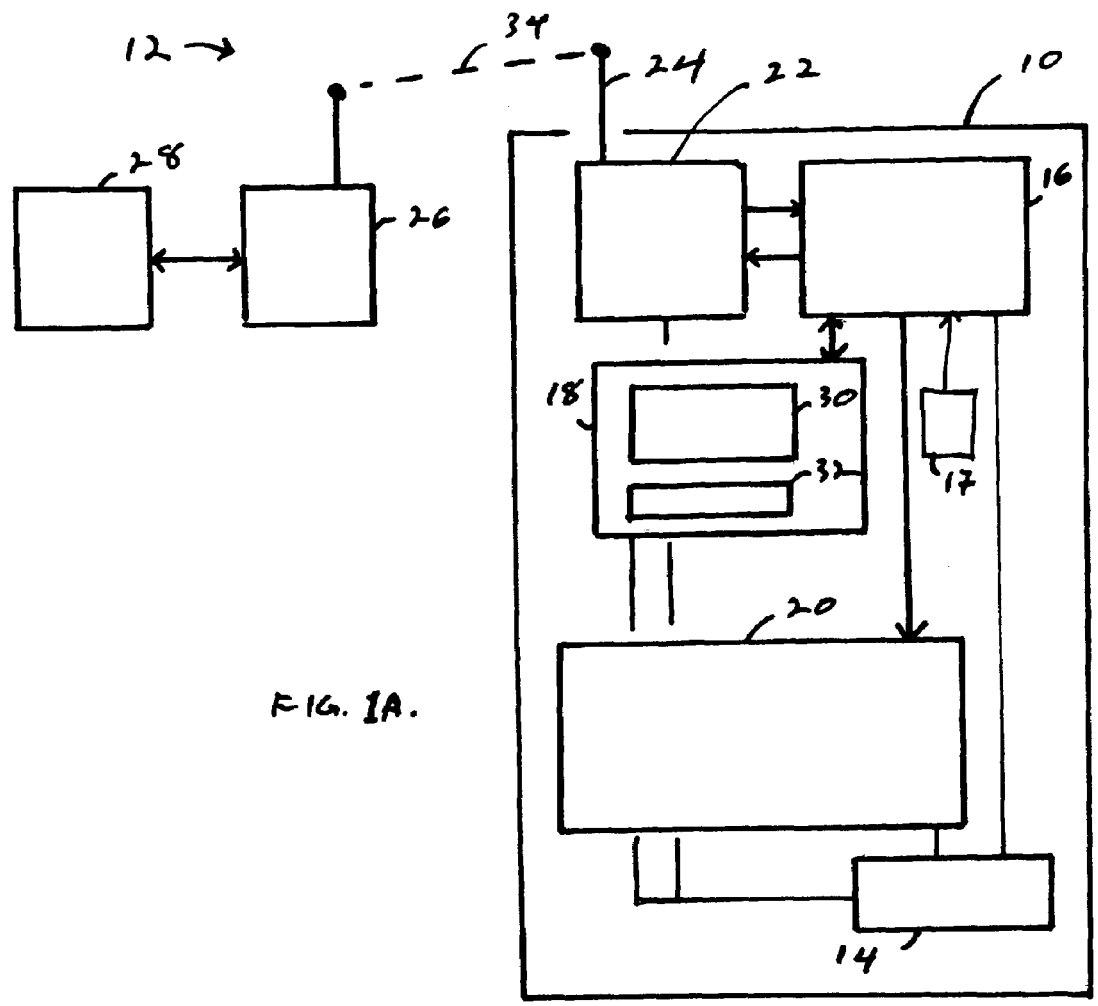
FIG. 1A is a simplified block diagram of a portable electronic device illustrated in a wireless communication system according to an embodiment of the present invention.

FIG. 1A is a simplified block diagram of a portable electronic device 10 in a wireless communication system 12 according to an embodiment of the present invention. The portable electronic device is a consumer-level product such as a cell phone, pager, PDA or similar device that generally has a power supply 14 (such as a battery or fuel cell), a processor 16, memory 18 (which can be integrated with the processor), and a display 20. A receiver 22, such as a wireless modem, coupled to an antenna 24 receives information broadcast from a transmitter 26 that is connected to a server 28 or similar device. The receiver typically also has transmitting capability, but this is not required in all embodiments, such as a pager embodiment. The transmitter typically also has receiving capability, but this is not required in all embodiments. This information can be processed by the processor and sent to various destinations, such as to a speaker (not shown), to the display, or stored in memory. The portable device also has a user input 17, such as a keypad and/or buttons.

The memory 18 may be random access memory ("RAM"), flash memory, magnetic memory, such as a magnetic disk, complementary metal-oxide-semiconductor ("CMOS") memory, or combinations of these and/or other memory. A computer-readable program 30 stored in the memory contains instructions for configuring the device according to the present invention. The memory typically also contains data 32 for use with the instructions. The program 30 contains instructions for rendering a coupon in a scannable format to the display according to received coupon information, and may further include instructions for converting one barcode format to another.

A signal, represented by the dashed line 34, is sent from the transmitter 26 to the receiver 22. The signal contains information used to generate a computer-readable coupon on the display 20 of the device, and could contain other information such as an expiration date, issuer identification, offer code, serialized identification numbers, value codes and user information. For example, the signal could contain information for generating a universal product code coupon code ("UPC Coupon Code") barcode and/or a UCC/EAN-128 barcode additional bars relating to the nature of the coupon, for example a percentage discount on the product, in addition to a code segment relating to the expiration date of the coupon. In another embodiment, the signal contains generic product information and the portable device translates the generic product information into an appropriate bar code, such as a UPC barcode, UPC Coupon Code, UCC/EAN-128 barcode or a CODE 49 barcode. Thus, the server could transmit generic product information to the user's device, and the device would configure the scannable coupon for the appropriate market.

Consider the user that travels internationally. A paper coupon generated in a store in California might not be usable in Hong Kong. Thus, the desires of both the coupon issuer and the consumer might be frustrated. However, devices according to the present invention might overcome this problem in at least two ways. First, the electronic coupon stored in the memory of the device can be re-configured to the local scanning standard. Alternatively, the coupon could be transmitted or re-transmitted to the user in the local format. In the latter case, the consumer might convert previously downloaded-coupons by transmitting them to a local server that re-transmits them back to the consumer.

Figure 1B:
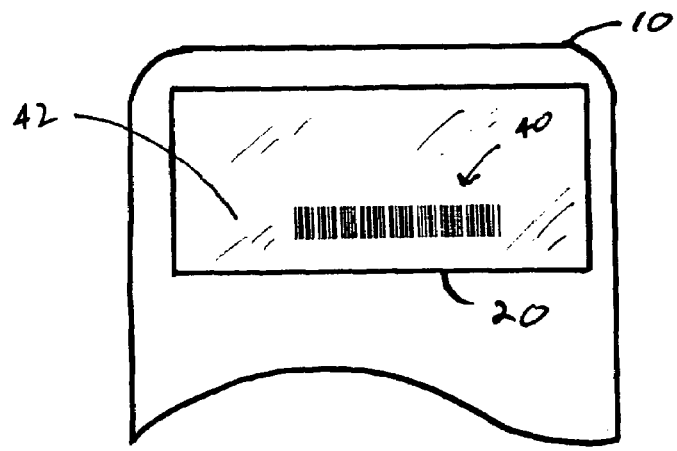
FIG. 1B is a simplified front view of a bar code coupon generated on the display of the device illustrated in FIG. 1A.

FIG. 1B is a simplified front view of a display 20 of a portable electronic device 10 showing a coupon 40 as a barcode. The display could be an LCD, for example, or other display suitable for use with portable electronic devices. In one embodiment, the display is an LCD with a nominal minimum dimension of about 10-13 mils (0.25-0.33 mm) and an inter-pixel spacing less than or equal to about 10% of the nominal minimum dimension. The maximum inter-pixel spacing is generally maintained in both the X and Y directions of the display because bar elements of the code are typically made from a number of vertically aligned pixels. The inter-pixel spacing does not need to be equal in all directions.

Conventional cell phones often have displays with much coarser resolution because the information to be displayed usually consists of alphanumeric characteristics adaptable to block pixel presentation. In other words, the alphanumeric characters are generated by darkening pixels within a character block. Each character block is basically rectangular in shape, and may have 8×7 pixels in each block, each pixel having a width equal to the width of a character vertical element for example, or a finer pitch display may generate characters out of smaller pixels. The characters are generally intended for viewing, and thus relatively large, bold characters are preferred. However, the lines of a bar code, for example, can be much finer than characters that are intended to be viewed by the user.

In one embodiment of the present invention, the display is a dot-matrix display of 200×200 pixels. The pixels have an aspect ratio of 1.5:1 (height:width) with a nominal minimum dimension of about 13 mils. The inter-pixel spacing is less than about 1.3 mils in both the X and Y directions. In another embodiment the pixels have an aspect ratio of about 3:1. It is possible to fabricate LCDs with dots (pixels) as small as about 150×50 microns with inter-pixel spacings of about 5 microns, which is adequate for barcode scanning.

However, dot-matrix LCDs are typically strobed to avoid needing to provide a drive circuit for each pixel. Strobing can interfere with the scanning operation because the pixel value might change during scanning. For example, a pixel is darkened on a first strobe signal, but is not scanned until just before the second strobe signal, wherein the pixel has relaxed to a lighter state. The lighter state might not provide the desired contrast between light and dark regions, thus leading to scanning errors. With conventional portable electronic devices that are meant to be viewed with the human eye, the eye usually compensates for the darkness variation arising from strobing.

There are at least two approaches to overcoming the strobe problem. The first is to strobe the LCD at a high rate so that the pixel never has a chance to relax to an undesired state. The other is to provide a persistent pixel that retains its darkened state until the next strobe. Typical strobe rates are around 100 mS, but this rate is exemplary only. Normally, quick response and quick relaxation of the liquid crystals are desired to provide a display that changes quickly; however, in some embodiments of the present invention it is desirable to use a liquid crystal that relaxes relatively slowly. Another way to maintain pixel darkness between strobe signals is to provide a local storage capacitor in parallel across each pixel to maintain an adequate voltage across the liquid crystals. Thus, the pixel state persists at an adequate contrast level between strobe voltages.

The display resolution required to generate a scannable coupon depends on the scanner system being used, and may also depend on the available size of the display. For example, if the display size is fairly limited, for example 30 mm×25 mm display on a cell phone or a 30 mm×10 mm display on a pager, a high resolution display may be required to present the entire bar code. Similarly, a high resolution display may be required to allow scanning by some types of devices, such as light pens or charge-coupled diode ("CCD") array devices.

A contrast-enhancing coating 42 is applied to the display area to improve contrast between spaces and bars in the code and to increase the first scan rate ("FSR") and to reduce the substitution rate when reading the bar code. The contrast-enhancing coating may include an anti-reflective coating, in addition to other coatings, and may be formed directly on the LCD module, or on a cover. If the display of the portable electronic device includes an active backlight, the contrast-enhancing coating may include a gray filter, for example. In some portable devices, particularly cell phones, the case of the cell phone includes a clear plastic window covering the LCD display module. Reflected light off the window can interfere with some scanners, thus the addition of an anti-reflective or other contrast-enhancing coating is particularly desirable with these devices. The coating can be formed directly on the window or LCD module, or can be applied to an adhesive film, which is then applied to the window.

In one embodiment, the display is a supertwisted nematic ("STN") LCD, which provides high contrast between the light and dark portions of the scannable code over a relatively large viewing angle. It is desirable that the display provides a contrast of 1:4 between the light and dark regions of the scannable code. In another embodiment, the display is a thin-film transistor ("TFT") LCD display. It is further desirable that the entire display area be available for other uses when not displaying a barcode. In other words, a portion of the display is not relegated only to displaying bar codes because of the nature of the display elements in that region. Some conventional displays have elongated pixels especially designated for forming bar codes, for example. Those elongated pixels may not be suitable for displaying other information in the region of those pixels.

In another embodiment, the display is an LCD with a nominal minimum dimension of about 25 mils (0.64 mm). Larger displays may operate with reduced resolution limits. For example, a PDA with a display measuring 125 mm×75 mm could produce a larger bar code label with lower resolution, suitable for reading with a laser scanner of the type often found in grocery stores or similar retail outlets. In addition to the bar code or other computer-readable coupon information, the display optionally displays text identifying the coupon.

FIG. 2A is a simplified flow chart of a coupon configuration process 200 according to an embodiment of the present invention. Coupon information is received (step 202) by the portable electronic device. The coupon information is received in a format allowing display generation, such as wireless application protocol ("WAP"), hand-held device markup language ("HDML"), or other format. The received coupon information is processed by the processor to construct the electronic coupon (step 204), and generates the coupon on the display (step 206).

FIG. 2B is a simplified flow chart of a coupon configuration process 210 according to another embodiment of the present invention. Coupon information from a coupon issuer is encrypted at a server (step 212) and sent to a handheld device using a wireless modem or similar technology (step 214). In one embodiment, the issuer checks a user code stored in the portable electronic device before sending the coupon information.

The coupon information contains both product and user information such as a serialized identification number and/or offer code, but could contain subsets of information, such as product information only. Using encrypted information is desirable to avoid having the user tamper with the discount rate, for example, and to avoid "masquerading", such as when an unintended recipient tries to use the coupon. Such masquerading often occurs with employees at the POS. The barcode information is then decrypted (step 216) in the handheld device and used to construct the electronic coupon (step 218). The coupon may be saved in local memory (step 220) and recalled (step 222) before being generated on the display (step 224). Alternatively, the decrypted coupon information could be stored, and the electronic coupon generated and displayed later. The electronic coupon and/or coupon information could be recalled in response to user entry, for example, such as in response to a button or keypad input.

Optionally, the issuer is linked to a computer at the POS and is automatically notified (step 226) that the coupon was used, and a second transmission from the server to the handheld device deletes the coupon from the memory of the handheld device (step 228). Alternatively, the computer at the POS queries the issuer to verify that the coupon is valid. In another embodiment, user information is stored locally in the handheld device and combined with the transmitted coupon information to render a scannable coupon having both product and user information. In another embodiment, the coupon information includes a date of expiration code and the coupon information is automatically deleted from the portable electronic device after an expiration date.

In a further embodiment, the handheld device converts the selected scannable format to an alternative scannable format. For example, the coupon might be rendered to the display in UPC Coupon Code format, whether the coupon is generated on the display essentially directly from the transmitted signal, or is decrypted or otherwise locally rendered to the display, and then selectively or automatically converted to UCC/EAN-128.

Figure 2C:
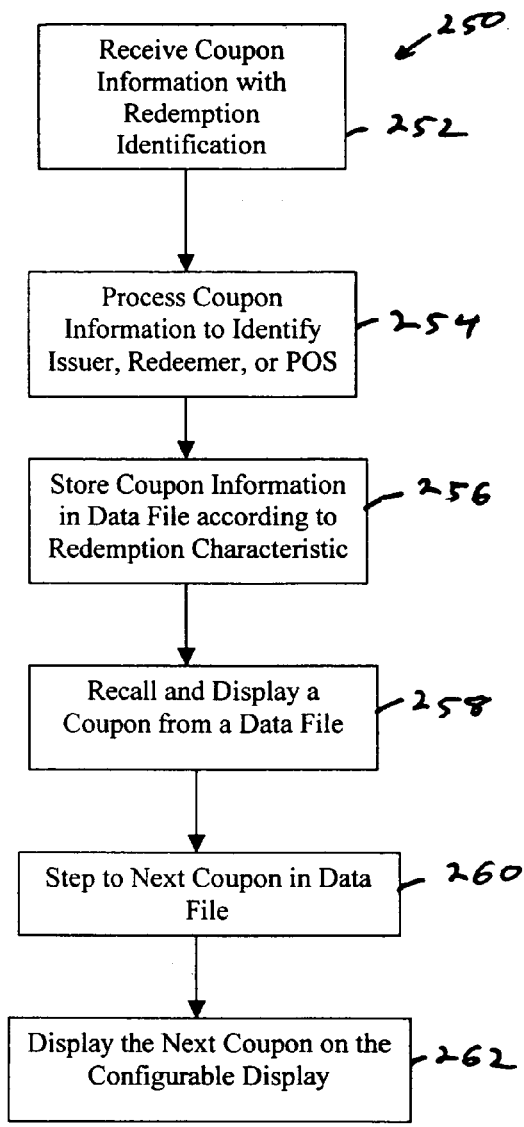
FIG. 2C is a simplified flow chart of another coupon configuration process according to another embodiment of the present invention.

FIG. 2C is a simplified flow chart of a process for storing and recalling coupon data 250 in a data file according to an embodiment of the present invention. The data file stores coupons according to issuer, redeemer, or POS, so that each coupon relating to an issuer or to be used at a particular POS, for example, is linked and may be recalled and displayed in a serial fashion. Coupon information containing redemption identification is received (step 252) and processed, such as by decryption or other processing, to identify the issuer, redeemer, POS, or similar entity (step 254), then the coupon information is stored in a date file relating to how the coupons will be redeemed (step 256). The coupons may be redeemed in a serial fashion by recalling and displaying one coupon in a data file(step 258). Upon user entry (step 260), such as stepping with an arrow key, the next coupon in that data file is displayed (step 262).

Figure 2D:
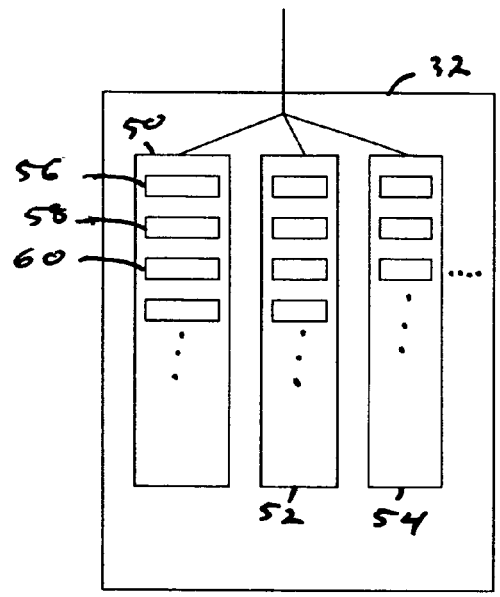
FIG. 2D is a simplified diagram of a data structure according to an embodiment of the present invention.

FIG. 2D is a simplified diagram of a data file structure in accordance with the process illustrated in FIG. 2C. The data file 32 contains subfiles 50, 52, 54, each subfile being associated with coupon redemption. Thus, each subfile contains various data fields 56, 58, 60 relating to coupons from or otherwise relating to that issuer or redeemer.

Figure 3:
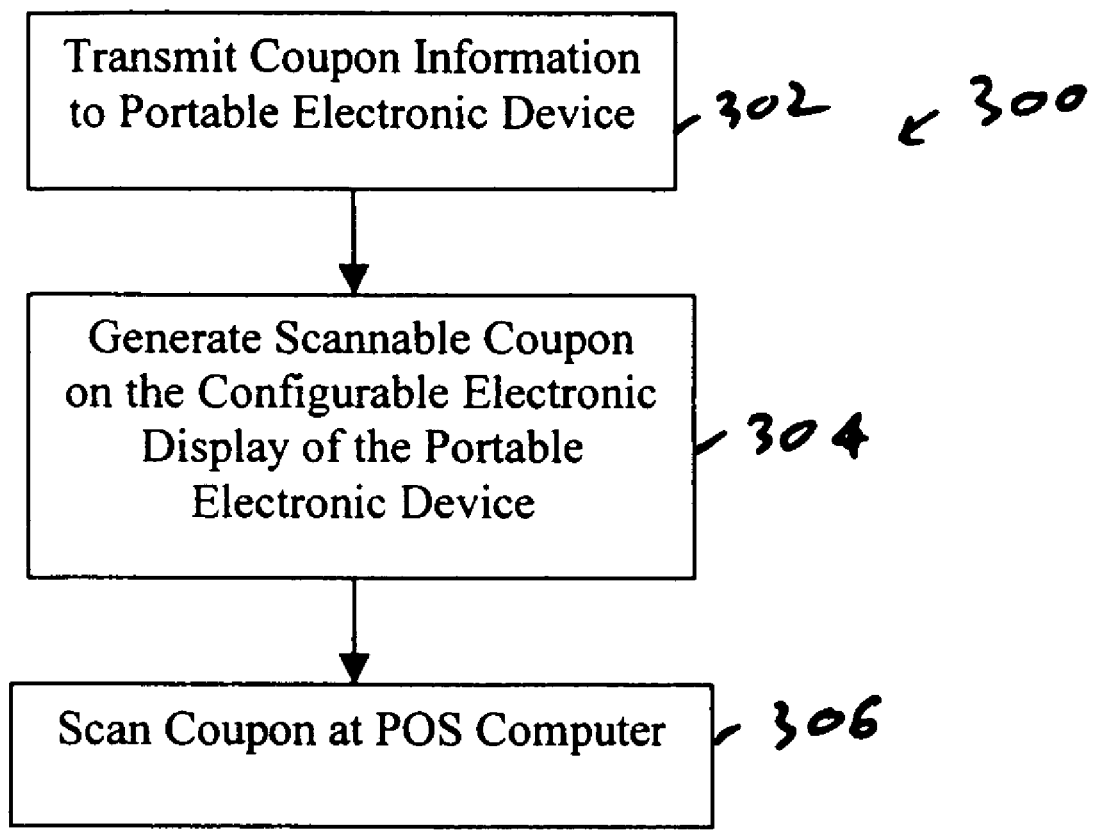
FIG. 3 is a simplified flow chart of a process for redeeming a coupon according to an embodiment of the present invention.

FIG. 3 is a simplified flow chart of a process for redeeming a coupon 300 according to an embodiment of the present invention. Coupon information is transmitted from a server to a portable electronic device (step 302). The portable electronic device generates a scannable coupon on a configurable display (step 304) from the coupon information. The displayed coupon is scanned by a POS computer (step 306) to automatically enter the coupon value into the POS computer.

While the invention has been described above in relation to specific embodiments, the details provided are illustrative and not restrictive. Other changes and modifications may be or become apparent to one of skill in the art, and it is desired that such changes and modifications that fall within the invention be protected.

What is claimed is:

1. A configurable portable electronic communication device comprising:
   a receiver configured to receive a wireless transmission containing coupon information;
   a processor electronically coupled to the receiver;
   a persistent dot-matrix liquid crystal display having a minimum nominal dimension of less than or equal to about 13 mils and an inter-pixel spacing of less than or equal to about 1.3 mils coupled to the processor;
   a memory containing a computer-readable program, the processor reading the computer-readable program to generate a scannable coupon code from the coupon information on the electronic display.

2. A configurable portable electronic communication device comprising:
   a receiver configured to receive an electronic wireless transmission containing coupon information;
   a processor electronically coupled to the receiver;
   an electronic display coupled to the processor, the electronic display having a nominal minimum dimension of less than about 13 mils and an inter-pixel spacing of less than about 1.3 mils;
   a memory containing a computer-readable program for generating a scannable coupon on the electronic display of the configurable portable electronic communication device from the coupon information and including instructions for converting the scannable coupon from a first scannable barcode format to a second scannable barcode format.

3. The configurable portable electronic communication device of claim 2 wherein the memory further contains a data file storing coupon information.

4. The configurable portable electronic communication device of claim 3 wherein the data file includes a plurality of subfiles, at least one of the plurality of subfiles containing a plurality of coupon data fields, each of the coupon data fields in the subfile being related according to redemption.

5. The configurable portable electronic communication device of claim 3 wherein the coupon information is encrypted and the computer-readable program contains instructions executable by the processor to decrypt the coupon information.

6. The configurable portable electronic communication device of claim 2 wherein the electronic display is a dot-matrix liquid crystal display having pixels capable of maintaining a contrast ratio of at least 1:4 between a light portion of a bar code and a dark portion of a bar code displayed on the electronic display between a first strobe signal and a second strobe signal to the pixels.

7. The configurable portable electronic communication device of claim 2 further comprising means for improving the first scan rate of the scannable coupon from the electronic display of the configurable portable electronic communication device.

8. The configurable portable electronic communication device of claim 7 wherein the means for improving the first scan rate comprises a contrast-enhancing coating disposed on the electronic display.

9. The configurable portable electronic communication device of claim 8 wherein the contrast-enhancing coating comprises an anti-reflective coating.

10. The configurable portable electronic communication device of claim 7 wherein the electronic display is a dot-matrix liquid crystal display and the means for improving the first scan rate comprises having a strobe rate of the dot-matrix liquid crystal display sufficiently high to maintain sufficient contrast for electronic scanning of the scannable coupon shown on the dot-matrix liquid crystal display.

11. The configurable portable electronic communication device of claim 7 wherein the means for improving the first scan rate comprises a liquid crystal display having sufficient persistence to maintain sufficient contrast for electronic scanning of the scannable coupon shown on the liquid crystal display.

* * * * *